(12) United States Patent
Danielsen et al.

(10) Patent No.: US 10,823,141 B2
(45) Date of Patent: Nov. 3, 2020

(54) SYSTEM AND METHOD FOR REDUCING LOADS DURING AN IDLING OR PARKED STATE OF A WIND TURBINE WITH A STUCK ROTOR BLADE

(71) Applicant: General Electric Company, Schenectady, NY (US)

(72) Inventors: Darren John Danielsen, Simpsonville, SC (US); Philip James Verzella, Gray Court, SC (US); Jignesh Govindlal Gandhi, Simpsonville, SC (US); Ramy Michael Souri, Greer, SC (US); James Paul Davidson, Simpsonville, SC (US); Christopher Lee Tschappatt, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 161 days.

(21) Appl. No.: 16/037,196

(22) Filed: Jul. 17, 2018

(65) Prior Publication Data

US 2020/0025171 A1    Jan. 23, 2020

(51) Int. Cl.
*F03D 7/02* (2006.01)
*F03D 17/00* (2016.01)
*F03D 7/04* (2006.01)

(52) U.S. Cl.
CPC .......... *F03D 7/0212* (2013.01); *F03D 7/042* (2013.01); *F03D 17/00* (2016.05); *F05B 2220/30* (2013.01); *F05B 2260/83* (2013.01); *F05B 2270/107* (2013.01); *F05B 2270/321* (2013.01); *F05B 2270/327* (2013.01); *F05B 2270/404* (2013.01)

(58) Field of Classification Search
CPC ...... F03D 7/0212; F03D 7/042; F03D 7/0224; F03D 7/0204; F03D 7/0264
See application file for complete search history.

(56) References Cited

U.S. PATENT DOCUMENTS

| | | |
|---|---|---|
| 7,445,420 B2 | 11/2008 | Yoshida |
| 7,728,452 B2 | 6/2010 | Arinaga et al. |
| 8,100,628 B2 | 1/2012 | Frese et al. |
| 8,680,700 B2 | 3/2014 | Gomez De Las Heras Carbonell et al. |
| 8,749,084 B2 | 6/2014 | Gjerlov et al. |
| 9,371,819 B2 | 6/2016 | Grabau |

(Continued)

OTHER PUBLICATIONS

U.S. Appl. No. 15/984,936, filed May 21, 2018.
European Search Report, dated Nov. 22, 2019.

*Primary Examiner* — Eldon T Brockman
(74) *Attorney, Agent, or Firm* — Dority & Manning, P.A.

(57) ABSTRACT

A method for reducing loads of a wind turbine includes determining an angular pitch speed parameter of the rotor blade of the wind turbine. The method also includes determining an operational state of the wind turbine. Further, the method includes comparing the angular pitch speed parameter to a predetermined parameter threshold during turbine shutdown and/or a commanded pitch event. If the operational state corresponds to a predetermined operational state, the method includes yawing a nacelle of the wind turbine away from an incoming wind direction when the angular pitch speed parameter is below the predetermined parameter threshold during the turbine shutdown and/or the commanded pitch event.

16 Claims, 5 Drawing Sheets

(56) References Cited

U.S. PATENT DOCUMENTS

| | | | |
|---|---|---|---|
| 9,416,771 B2 | 8/2016 | Obrecht et al. | |
| 2009/0066089 A1 | 3/2009 | Atinaga et al. | |
| 2009/0081041 A1* | 3/2009 | Frese | F03D 7/0268 416/1 |
| 2011/0280725 A1* | 11/2011 | Taylor | F03D 7/0224 416/1 |
| 2015/0337802 A1* | 11/2015 | Su | F03D 7/0224 416/1 |

* cited by examiner

SYSTEM AND METHOD FOR REDUCING LOADS DURING AN IDLING OR PARKED STATE OF A WIND TURBINE WITH A STUCK ROTOR BLADE

FIELD

The present disclosure relates generally to wind turbines, and more particularly to systems and methods for reducing loads during an idling or parked state of a wind turbine with a stuck rotor blade by yawing the wind turbine out of the wind.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation, the direction of the wind which powers the wind turbine may change. The wind turbine may thus adjust the nacelle through, for example, a yaw adjustment about a longitudinal axis of the tower to maintain alignment with the wind direction. In addition, when the wind turbine is parked or idling, conventional control strategies include actively tracking the wind direction to provide better alignment to the wind direction so as to minimize start-up delays when the wind speed increases or decreases back into the operating range.

However, in a situation where the wind turbine is faulted and one of the rotor blades remains stuck (unlike the normal idling situation), there are limited benefits to tracking the wind as repair is needed before restarting the wind turbine. In addition, in such situations, the wind turbine experiences increased loads due to the stuck rotor blade as well as rotor imbalance.

Accordingly, improved systems and methods for reducing loads during an idling or parked state of a wind turbine would be desired. In particular, the present disclosure is directed to systems and methods which actively yaw the nacelle of the wind turbine out of the wind when the wind turbine is idling or parked and one of the rotor blades is stuck so as to reduce loads during this scenario.

BRIEF DESCRIPTION

Aspects and advantages of the invention will be set forth in part in the following description, or may be obvious from the description, or may be learned through practice of the invention.

In one aspect, the present disclosure is directed to a computer method for reducing loads of a wind turbine. The method includes determining an angular pitch speed parameter of the rotor blade of the wind turbine. The method also includes determining an operational state of the wind turbine. Further, the method includes comparing the angular pitch speed parameter to a predetermined parameter threshold during turbine shutdown and/or a commanded pitch event. If the operational state corresponds to a predetermined operational state, the method includes yawing a nacelle of the wind turbine away from an incoming wind direction when the angular pitch speed parameter is below the predetermined parameter threshold during the turbine shutdown and/or the commanded pitch event.

In one embodiment, the angular pitch speed parameter may be an angular pitch speed or derivatives thereof (such as acceleration). As such, in particular embodiments, the step of determining the angular pitch speed parameter of the rotor blade of the wind turbine may include monitoring sensor signals generated by at least one sensor associated with the rotor blade and determining the angular pitch speed parameter based on the sensor signals. For example, in one embodiment, the sensor may include an encoder, an accelerometer, an inclination sensor, a gyroscopic sensor, a resolver, a tachometer, an optical sensor, a photo sensor, a proximity sensor, a generator, a laser sensor, or any other suitable speed measuring sensor.

In such embodiments, where encoders are used, the step of determining the angular pitch speed parameter of the rotor blade of the wind turbine may include incrementally counting monitored pulses generated by the encoder and determining the angular pitch speed as a function of the counted pulses. In further embodiments, the method can easily include determining a derivative of angular pitch speed, for example, where accelerometers are used. It should be understood that any other angular speed measuring device may also be used to determine the angular pitch speed parameter.

In further embodiments, the step of comparing the angular pitch speed parameter to the predetermined parameter threshold may include comparing the counted pulses to a predetermined pulse threshold. As such, the predetermined pulse threshold represents a minimum amount of counted pulses needed for the rotor blade to be considered rotating.

In several embodiments, the predetermined operational state of the wind turbine comprises at least one of an idling state, a parked state, or a maintenance state.

In additional embodiments, the method may include continuously monitoring the incoming wind direction and yawing the nacelle into the incoming wind direction if the angular pitch speed parameter is above the predetermined parameter threshold.

In particular embodiments, the method may further include monitoring a wind speed at the wind turbine and actively yawing the nacelle of the wind turbine away from the incoming wind direction only if the wind speed exceeds a set wind speed threshold.

In yet another embodiment, the method may include automatically yawing the nacelle of the wind turbine away from the incoming wind direction. In alternative embodiments, the method may include manually yawing the nacelle of the wind turbine away from the incoming wind direction. In such embodiments, when operating in a manual mode, the method may include continuously yawing the nacelle of the wind turbine away from the incoming wind direction.

In another aspect, the present disclosure is directed to a system for reducing loads of a wind turbine. The system includes at least one sensor configured for monitoring a rotor blade of the wind turbine and a controller communicatively coupled to the sensor(s). The controller includes at least one processor configured to perform one or more operations, including but not limited to receiving sensor signals from the sensor(s), determining the angular pitch speed parameter of the rotor blade based on the sensor signals during a turbine shutdown and/or a commanded pitch event, determining an operational state of the wind turbine, comparing the angular pitch speed parameter to a predetermined parameter threshold, and if the operational state corresponds to a predetermined operational state, yawing a nacelle of the wind turbine away from an incoming wind direction for as long as the angular pitch speed parameter is below the predetermined parameter threshold during the turbine shutdown and/or the commanded pitch event. It should also be understood that the system may further include any of the additional features as described herein.

In yet another aspect, the present disclosure is directed to a method for reducing loads of a wind turbine. The method includes monitoring, via an encoder (or any other suitable angular speed sensor), pulse or other speed signals of the rotor blade of the wind turbine. The method also includes determining a pitch angular speed as a function of the pulse signals. Further, the method includes comparing the pitch angular speed to a predetermined speed threshold. If the pitch angular speed is below the predetermined speed threshold, the method includes yawing a nacelle of the wind turbine away from an incoming wind direction. It should also be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
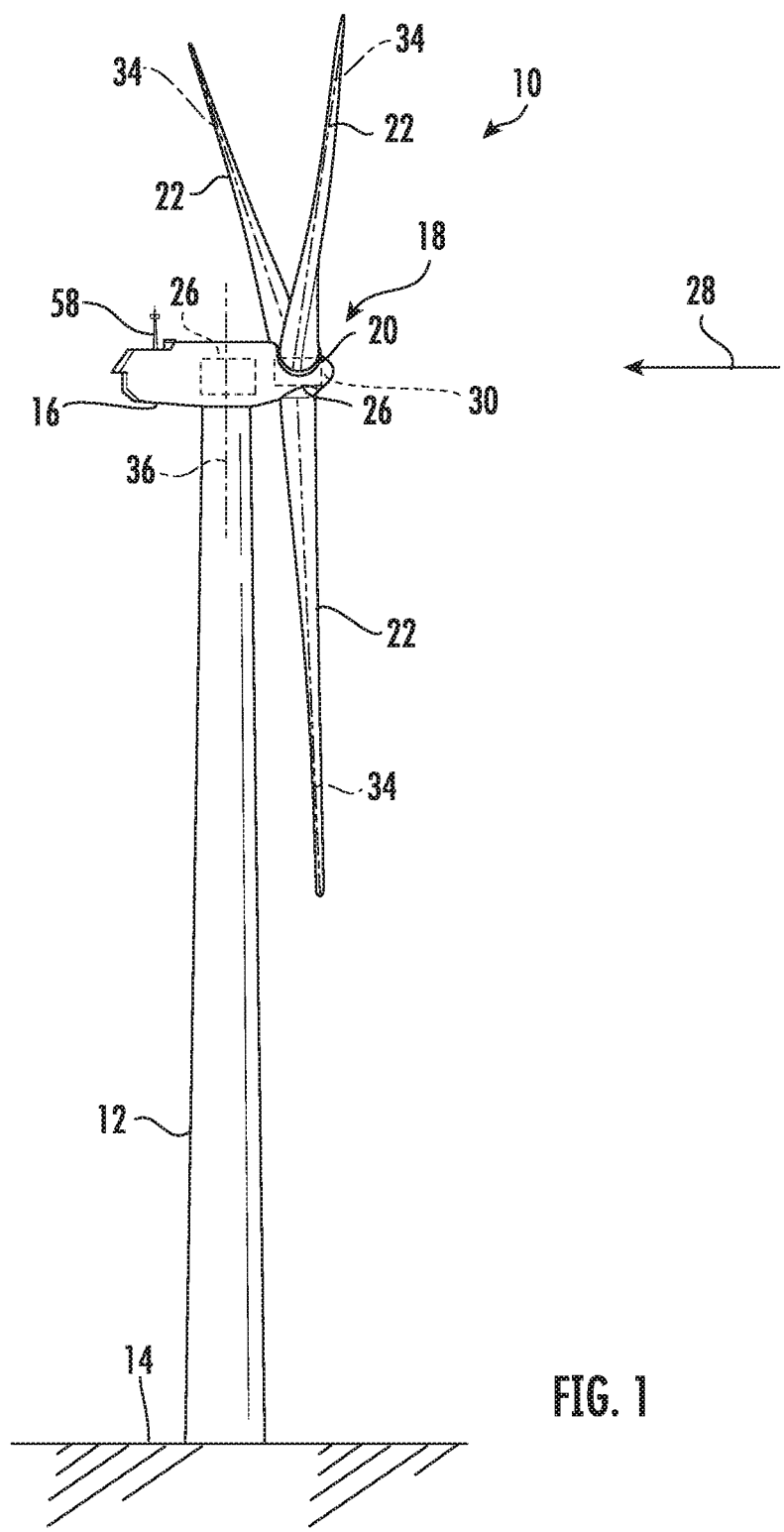
FIG. 1 illustrates a perspective view of a wind turbine according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
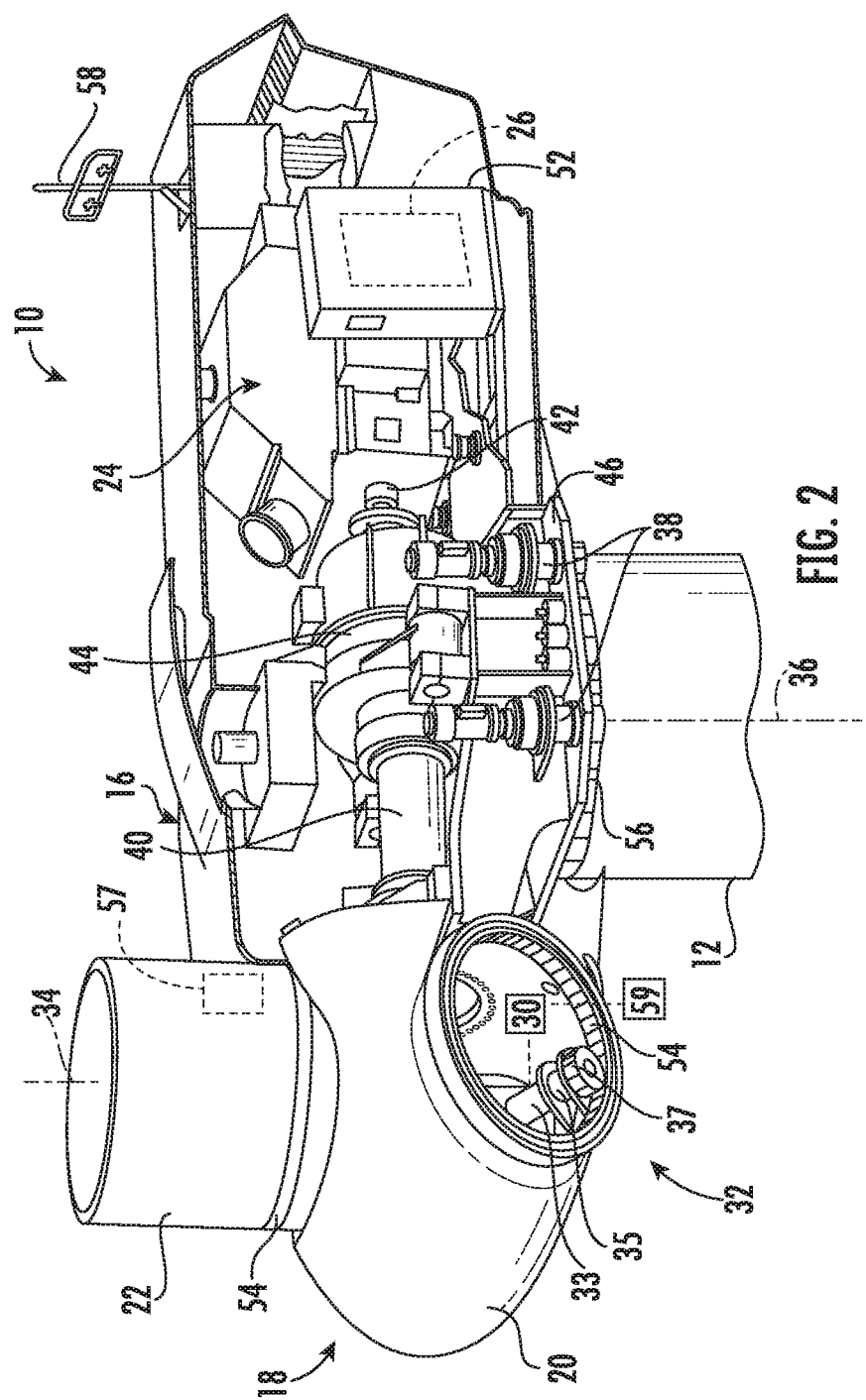
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40.

It should be appreciated that the main shaft 40 may generally be supported within the nacelle 16 by a support frame or bedplate 46 positioned atop the wind turbine tower 12. For example, the main shaft 40 may be supported by the bedplate 46 via a pair of pillow blocks 48, 50 mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

In addition, as shown in FIG. 2, one or more sensors 57, 58 may be provided on the wind turbine 10. More specifically, as shown, a blade sensor 57 may be configured with one or more of the rotor blades 22 to monitor the rotor blades 22. It should also be appreciated that, as used herein, the term "monitor" and variations thereof indicates that the various sensors of the wind turbine 10 may be configured to provide a direct measurement of the parameters being monitored or an indirect measurement of such parameters. Thus, the sensors described herein may, for example, be used to generate signals relating to the parameter being monitored, which can then be utilized by the controller 26 to determine the condition.

Further, as shown, a wind sensor 58 may be provided on the wind turbine 10. The wind sensor 58, which may for example be a wind vane, and anemometer, and LIDAR sensor, or another suitable sensor, may measure wind speed and direction. As such, the sensors 57, 58 may further be in communication with the controller 26, and may provide related information to the controller 26. For example, yawing of the wind turbine 10 may occur due to sensing of changes in the wind direction 28, in order to maintain alignment of the wind turbine 10 with the wind direction 28. In addition, yawing of the wind turbine 10 may occur due to sensing a stuck blade, which is described in more detail herein.

Further, the turbine controller 26 may also be communicatively coupled to various components of the wind turbine 10 for generally controlling the wind turbine 10 and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Further, as the direction 28 of the wind changes, the turbine controller 26 may be configured to control a yaw angle of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10, via a yaw controller or direct transmission, such that the nacelle 16 may be rotated about the yaw axis 36 via a yaw bearing 56.

Still referring to FIG. 2, each rotor blade 22 may also include a pitch adjustment mechanism 32 configured to rotate each rotor blade 22 about its pitch axis 34. Further, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 54 coupled between the hub 20 and a corresponding rotor blade 22 such that rotation of the pitch drive pinion 37 causes rotation of the pitch bearing 54. Thus, in such embodiments, rotation of the pitch drive motor 33 drives the pitch drive gearbox 35 and the pitch drive pinion 37, thereby rotating the pitch bearing 54 and the rotor blade 22 about the pitch axis 34.

As such, the turbine controller 26 may be communicatively coupled to each pitch adjustment mechanism 32 of the wind turbine 10 (one of which is shown) through a pitch controller 30 for controlling and/or altering the pitch angle of the rotor blades 22 (i.e., an angle that determines a perspective of the rotor blades 22 with respect to the direction 28 of the wind). For instance, the turbine controller 26 and/or the pitch controller 30 may be configured to transmit a control signal/command to each pitch adjustment mechanism 32 such that the pitch adjustment mechanism(s) 32 adjusts the pitch angle of the rotor blades 22 as described herein. The turbine controller 26 may control the pitch angle of the rotor blades 22, either individually or simultaneously, by transmitting suitable control signals/commands to a pitch controller of the wind turbine 10, which may be configured to control the operation of a plurality of pitch drives or pitch adjustment mechanisms 32 of the wind turbine, or by directly controlling the operation of the plurality of pitch drives or pitch adjustment mechanisms.

In addition, as shown, the pitch drive mechanism(s) 32 described herein may also include an encoder 59 communicatively coupled to the pitch controller 30 and/or the turbine controller 26. In one embodiment, the encoder 59 may be an incremental encoder that provides encoder signals for input to the controllers 26, 30 via one or more I/O interfaces (not shown). Accordingly, the pitch encoder 59 may be in communication with the turbine controller 26 to produce sensor signals representative of the angular pitch speed parameter of the rotor blade 22, such as an angular pitch speed. Thus, the turbine controller 26 may be configured to determine an average encoder speed during certain time intervals.

Figure 3:
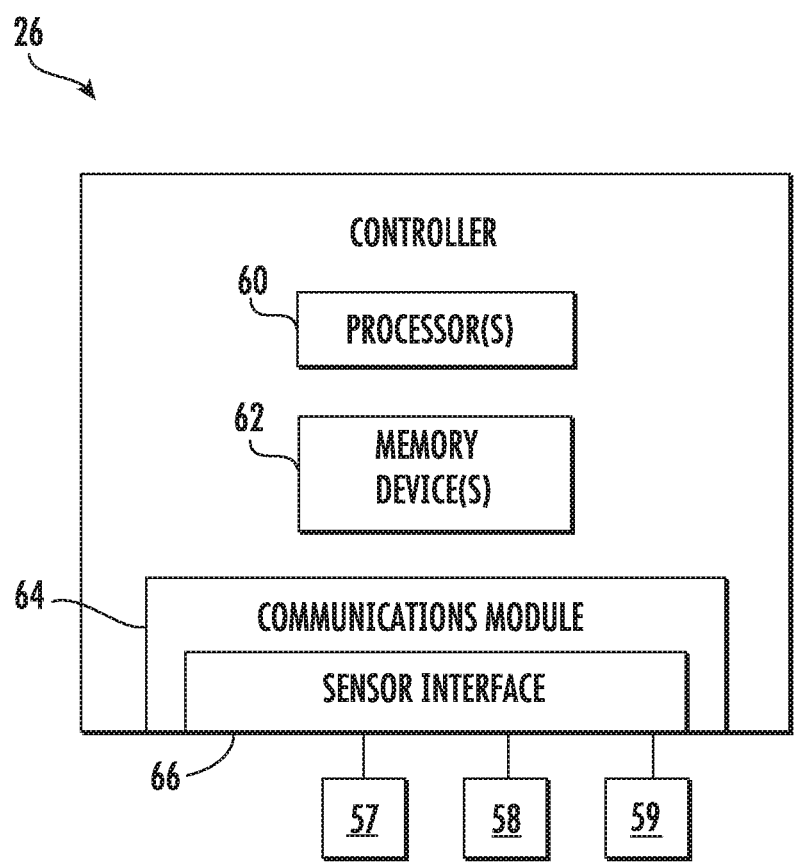
FIG. 3 illustrates a schematic diagram of one embodiment of suitable components that may be included in a wind turbine controller according to the present disclosure.

Referring now to FIG. 3, there is illustrated a block diagram of one embodiment of suitable components that may be included within the controller 26 according to the present disclosure. As shown, the controller 26 may include one or more processor(s) 60 and associated memory device(s) 62 configured to perform a variety of computer-implemented functions (e.g., performing the methods, steps, calculations and the like and storing relevant data as disclosed herein). Additionally, the controller 26 may also include a communications module 64 to facilitate communications between the controller 26 and the various components of the wind turbine 10. Further, the communications module 64 may include a sensor interface 66 (e.g., one or more analog-to-digital converters) to permit signals transmitted from one or more sensors 57, 58, 59 to be converted into signals that can be understood and processed by the processors 60. It should be appreciated that the sensors 57, 58, 59 may be communicatively coupled to the communications module 64 using any suitable means. For example, as shown in FIG. 3, the sensors 57, 58, 59 are coupled to the sensor interface 66 via a wired connection. However, in other embodiments, the sensors 57, 58, 59 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

As discussed above, a wind turbine 10, such as the nacelle 16 thereof, may rotate about the yaw axis 36 as required. In particular, rotation about the yaw axis 36 may occur due to changes in the wind direction 28, such that the rotor 18 is aligned with the wind direction 28. For example, when the wind turbine 10 is in an idling state, the controller 26 actively tracks the wind direction to provide better alignment to the wind and minimize start-up delays when the wind speed increases or decreases back into the operating range. However, in a situation where the wind turbine 10 is in an idling state, a parked state, or a maintenance state and one or more of the rotor blades 22 is prevented from rotating (i.e. stuck) (unlike the normal idling situation), there are limited benefits to tracking the wind because repair will be required before restarting the wind turbine 10. Thus, in such situations, the turbine controller 26 is configured to implement a control strategy to reduce the drag force on the faulted rotor blade so as to reduce loads thereon and/or to prevent rotor imbalance.

Figure 4:
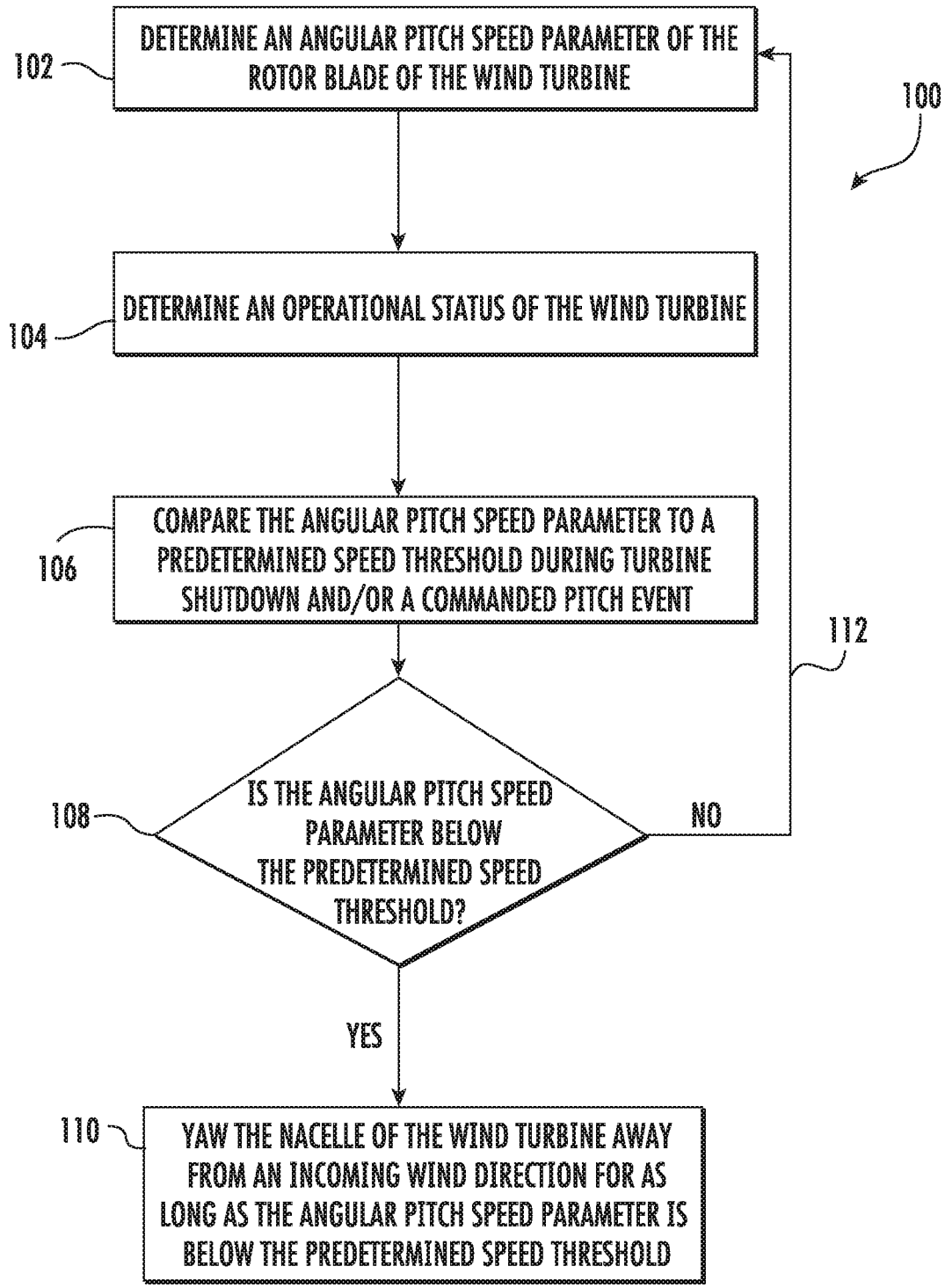
FIG. 4 illustrates a flow diagram of one embodiment of a method for reducing loads of a wind turbine according to the present disclosure.

More specifically, as shown in FIG. 4, a flow diagram of one embodiment of a method 100 for reducing loads of the wind turbine 10 in situations where the wind turbine 10 is in an idling state, a parked state, or a maintenance state and one or more of the rotor blades 22 is prevented from rotating (i.e. stuck). In general, the method 100 will be described herein with reference to the wind turbine 10 shown in FIGS. 1 and 2, as well as the various controller components shown in FIG. 3. However, it should be appreciated that the disclosed method 100 may be implemented with wind turbines having any other suitable configurations and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Figure 5:
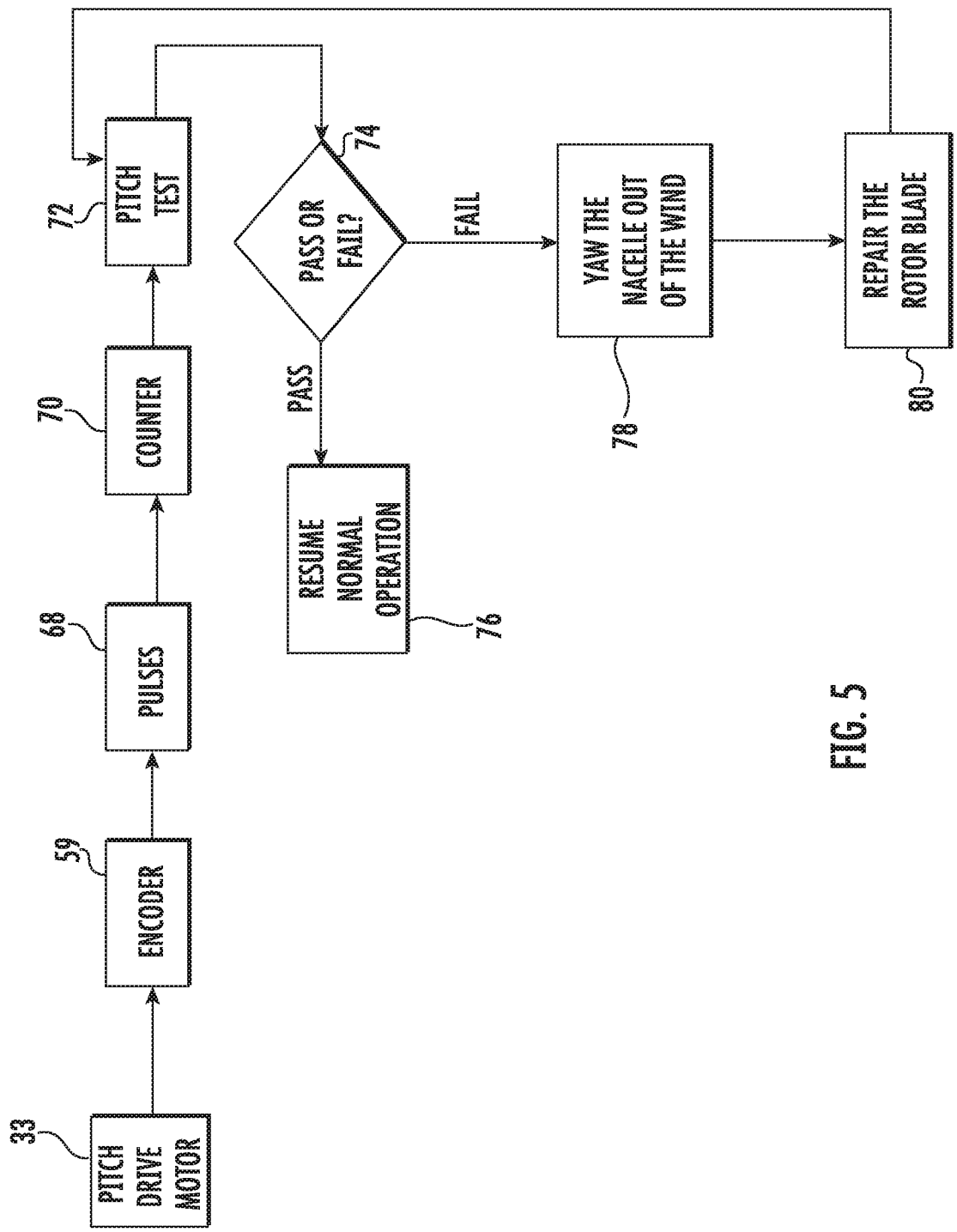
FIG. 5 illustrates a block diagram of one embodiment of a method for reducing loads of a wind turbine according to the present disclosure.

As shown at 102, the method 100 includes determining an angular pitch speed parameter of the rotor blade 22 of the wind turbine 10. As used herein, the angular pitch speed parameter generally refers to the speed of rotor blade 22 in a rotating direction or derivatives thereof, such as acceleration. Thus, example angular pitch speed parameters can be measured through movement of the pitch drive motor 33, the pitch drive gearbox 35, the rotor blade 22, the bearing, and/or any blade component that is moving because the rotor blade 22 is rotating. For example, as shown in FIG. 5, the controller 26 may be configured to monitor speed signals 68 generated by a sensor (such as the encoder 59). In such embodiments, the controller 26 may also be configured to incrementally count the monitored pulses 68 generated by the encoder 59 and determine the angular pitch speed as a function of the counted pulses. In addition, it should be understood that additional speed signals and components thereof may also be monitored, including but not limited to pulses, sine waves, cosine waves, frequency, amplitude, etc. In further embodiments, the angular pitch speed parameter of the rotor blade 22 could also be measured using a proximity sensor, an optical sensor, a camera, an accelerometer, an inclination sensor, an gyroscopic sensor, a resolver, a tachometer, an optical sensor, a photo sensor, a proximity sensor, a generator, a laser sensor, or similar. More specifically, in certain embodiments, e.g. where accelerometers are used, the sensors may be used to determine a derivative of the angular pitch speed parameter rather than the speed itself.

Referring back to FIG. 4, as shown at 104, the method 100 includes determining an operational state of the wind turbine 10. In such embodiments, the operational state of the wind turbine 10 may be an idling state, a parked state, and/or a maintenance state or combinations thereof. As used herein, the "idling state" of the wind turbine 10 generally refers to the operational state where, due to lack of wind or some other operational conditions (e.g. faults), the rotatable hub 20 of the wind turbine 10 is allowed to rotate (i.e. idle) at low rotational speeds, e.g. around 0.2 rpm, rather than being stopped completely. In contrast, a "parked state" of the wind turbine 10 generally refers to the operational state where the rotatable hub 20 is stopped and prevented from rotating. In addition, a "maintenance state" of the wind turbine 10 generally refers to operational state where one or more of the rotor blades 22 is undergoing a maintenance procedure and the wind turbine 10 is shut down. Therefore, in certain embodiments, the maintenance state and the parked state may be synonymous.

Still referring to FIG. 4, as shown at 106, the method 100 includes comparing the angular pitch speed parameter to a predetermined parameter threshold, such as a predetermined speed threshold, during a shutdown and/or a commanded pitch event. As used herein, a commanded pitch event generally refers to an instance where the rotor blade 22 is commanded to move. As such, during idling, the rotor blade 22 is not commanded to move. Therefore, the controller 26 can detect that the rotor blade 22 is stuck while the wind turbine 10 is shutting down (i.e. before idling) or purposely command the rotor blade 22 to move while in idle to check if the blade is stuck. In further embodiments, the controller 26 may be configured to compare the counted pulses measured by the encoder 59 to a predetermined pulse threshold. As such, the predetermined pulse threshold represents a minimum amount of counted pulses needed for the rotor blade 22 to be considered rotating (i.e. unstuck).

As shown at 108, the controller 26 is configured to determine whether the angular pitch speed parameter (or counted pulses) is below the predetermined parameter threshold (or predetermined pulse threshold). If so, as shown in FIG. 5, the controller 26 may initiate a counter 70 for a certain time period, e.g. such as 24 hours. Once the counter 70 begins, the controller 26 (or personnel) can implement a pitch test 72 for the rotor blade 22 to check whether the blade is still stuck by determining if the angular pitch speed parameter has increased to the predetermined parameter threshold. If the rotor blade 22 passes the pitch test 72, operation of the wind turbine 10 resumes normal operation as shown at 76. If the time period expires and a successful pitch test has not occurred (i.e. the angular pitch speed parameter remains below the predetermined parameter threshold), as shown at 110 of FIG. 4, the method 100 includes yawing the nacelle 16 of the wind turbine 10 away from the incoming wind direction 28 for as long as the angular pitch speed parameter is below the predetermined parameter threshold. More specifically, as shown at 78 of FIG. 5, the controller 26 is configured to yaw the nacelle 16. In addition, as shown at 80, the controller 26 may subsequently repair the stuck rotor blade 22.

In one embodiment, e.g. during the idling state, the controller 26 may be configured to automatically yaw the nacelle 16 away from the incoming wind direction. In alternative embodiments, e.g. during the maintenance state, a user can manually select to yaw the nacelle 16 away from the incoming wind direction. Accordingly, yawing the nacelle 16 out of the wind in these situations provides substantial loads reduction. After the stuck rotor blade 22 has been repaired, the controller 26 may also be configured to reset the counter and repeat the method 100 as desired.

If the angular pitch speed parameter remains above the predetermined parameter threshold, as shown at 112, the controller 26 is configured to continue determining the angular pitch speed parameter of the rotor blade 22 to ensure one of the blades do not become stuck. More particularly, in certain embodiments, the controller 26 may also continuously monitor the incoming wind direction 28 and yaw the nacelle 16 into the incoming wind direction 28 if the angular pitch speed parameter is above the predetermined threshold. In addition, the method 100 may further include monitoring a wind speed at the wind turbine 10, e.g. via sensor 58 and yawing the nacelle 16 away from the incoming wind direction 28 only if the wind speed exceeds a set wind speed threshold.

In yet another embodiment, the controller 26 may also be configured to pitch the rotor blades 22 of the wind turbine 10 so as to reduce loads. It should be understood that such pitching may be implemented by the controller 26 in combination with yawing the nacelle 16 out of the wind or as a separate loads reduction action.

It should also be understood that if the wind turbine 10 continues to operate normally, the controller 26 is configured to continuously monitor the incoming wind direction 28 and yaw the nacelle 16 into the incoming wind direction 28 to provide improved alignment to the wind with minimal start-up delays when the wind speed increases or decreases back into the operating range.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing loads of a wind turbine, the method comprising:
    determining an angular pitch speed parameter of the rotor blade of the wind turbine determining the angular pitch speed parameter comprising:
        monitoring pulses generated by an encoder of a pitch drive mechanism,
        specifying a certain time interval,
        initiating a counter for the time interval,
        counting, via the counter, the monitored pulses generated by the encoder over the certain time interval, and
        determining the angular pitch speed parameter of the rotor blade as a function of the counted pulses;
    determining an operational state of the wind turbine;
    comparing the angular pitch speed parameter to a predetermined parameter threshold during turbine shutdown and/or a commanded pitch event; and
    if the operational state corresponds to a predetermined operational state, yawing a nacelle of the wind turbine away from an incoming wind direction for as long as the angular pitch speed parameter is below the predetermined parameter threshold.

2. The method of claim 1, wherein comparing the angular pitch speed parameter to the predetermined parameter threshold further comprises comparing the counted pulses to a predetermined pulse threshold, the predetermined pulse threshold representing a minimum amount of counted pulses needed for the rotor blade to be considered rotating.

3. The method of claim 1, wherein the predetermined operational state of the wind turbine comprises at least one of an idling state, a parked state, or a maintenance state.

4. The method of claim 1, further comprising continuously monitoring the incoming wind direction and yawing the nacelle into the incoming wind direction if the angular pitch speed parameter is above the predetermined parameter threshold.

5. The method of claim 1, further comprising monitoring a wind speed at the wind turbine and actively yawing the nacelle of the wind turbine away from the incoming wind direction only if the wind speed exceeds a set wind speed threshold.

6. The method of claim 1, further comprising automatically yawing the nacelle of the wind turbine away from the incoming wind direction.

7. The method of claim 1, further comprising manually yawing the nacelle of the wind turbine away from the incoming wind direction.

8. A system for reducing loads of a wind turbine, the system comprising:
    at least one sensor configured for monitoring a rotor blade of the wind turbine;
    a controller communicatively coupled to the at least one sensor, the controller comprising at least one processor configured to perform one or more operations, the one or more operations comprising:
        receiving sensor signals from the at least one sensor;
        determining an angular pitch speed parameter of the rotor blade based on the sensor signals, determining the angular pitch speed parameter comprising:
            monitoring pulses generated by the at least one sensor,
            specifying a certain time interval,
            initiating a counter for the time interval,
            counting, via the counter, the monitored pulses generated by the at least one sensor over the certain time interval, and
            determining the angular pitch speed parameter of the rotor blade as a function of the counted pulses;
        determining an operational state of the wind turbine;
        comparing the angular pitch speed parameter to a predetermined parameter threshold during turbine shutdown and/or a commanded pitch event; and
        if the operational state corresponds to a predetermined operational state, yawing a nacelle of the wind turbine away from an incoming wind direction for as long as the angular pitch speed parameter is below the predetermined parameter threshold.

9. The system of claim 8, wherein the at least one sensor comprises at least one of an encoder, an accelerometer, an inclination sensor, a gyroscopic sensor, a resolver, a tachometer, an optical sensor, a photo sensor, a proximity sensor, a generator, or a laser sensor.

10. The system of claim 9, wherein the at least one sensor monitors sensor signals generated by a pitch drive motor of the rotor blade.

11. The system of claim 9, wherein comparing the angular pitch speed parameter to the predetermined parameter threshold further comprises comparing the counted pulses to a predetermined pulse threshold, the predetermined pulse threshold representing a minimum amount of counted pulses needed for the rotor blade to be considered rotating.

12. The system of claim 8, wherein the predetermined operational state of the wind turbine comprises at least one of an idling state, a parked state, or a maintenance state.

13. The system of claim 8, wherein the one or more operations further comprise continuously monitoring the incoming wind direction and yawing the nacelle into the incoming wind direction if the angular pitch speed parameter is above the predetermined parameter threshold.

14. The system of claim 8, wherein the one or more operations further comprise monitoring a wind speed at the wind turbine and actively yawing the nacelle of the wind turbine away from the incoming wind direction only if the wind speed exceeds a set wind speed threshold.

15. The system of claim 8, wherein the one or more operations further comprise automatically yawing the nacelle of the wind turbine away from the incoming wind direction.

16. The system of claim 8, wherein the one or more operations further comprise manually yawing the nacelle of the wind turbine away from the incoming wind direction.

* * * * *